(12) United States Patent
Scott et al.

(10) Patent No.: US 12,175,241 B1
(45) Date of Patent: Dec. 24, 2024

(54) MACHINE LEARNING-BASED UNIVERSAL SOFTWARE COMPONENT IDENTIFICATION

(71) Applicant: NetRise, Inc., Austin, TX (US)

(72) Inventors: Michael Scott, Daphne, AL (US); Yaroslav Oliinyk, Evanston, IL (US)

(73) Assignee: NetRise, Inc., Austin, TX (US)

( * ) Notice: Subject to any disclaimer, the term of this patent is extended or adjusted under 35 U.S.C. 154(b) by 0 days.

(21) Appl. No.: 18/780,334

(22) Filed: Jul. 22, 2024

(51) Int. Cl.
  *G06F 8/71* (2018.01)
  *G06F 8/41* (2018.01)

(52) U.S. Cl.
  CPC ............... *G06F 8/71* (2013.01); *G06F 8/436* (2013.01)

(58) Field of Classification Search
  None
  See application file for complete search history.

(56) References Cited

U.S. PATENT DOCUMENTS

| | | | | |
|---|---|---|---|---|
| 11,693,965 B1* | 7/2023 | Briliauskas | .......... | G06F 21/566 726/22 |
| 2017/0262633 A1* | 9/2017 | Miserendino | .......... | G06N 5/025 |
| 2018/0150548 A1* | 5/2018 | Shah | .......... | G06F 16/211 |
| 2021/0279042 A1* | 9/2021 | Allamanis | .......... | G06N 3/049 |
| 2021/0312134 A1* | 10/2021 | Creed | .......... | G06N 20/00 |
| 2022/0366038 A1* | 11/2022 | Summers | .......... | G06F 21/552 |
| 2023/0161879 A1* | 5/2023 | Koo | .......... | G06F 21/554 726/23 |
| 2023/0176838 A1* | 6/2023 | Bronevetsky | .......... | G06F 8/71 717/110 |
| 2023/0367849 A1* | 11/2023 | Radu | .......... | G06F 18/213 |
| 2024/0220803 A1* | 7/2024 | Annamalai | .......... | G06N 3/045 |

* cited by examiner

*Primary Examiner* — Marina Lee
(74) *Attorney, Agent, or Firm* — Jones Day

(57) ABSTRACT

A software package is received which encapsulates a plurality of files which are then extracted. For those files that cannot be identified, an embedding is generated. Different file types can employ different embedding generating techniques. Using this embedding, a set of potential software packages to the file from which the embedding was generated is calculated. This calculation can use, for example, one or more similarity analysis techniques relative to a set of mapped packages and embeddings (i.e., a set of known software packages and embeddings corresponding to known constituent files, etc.). The calculation can be used to determine an identity of the software package. The determined identity can be provided to a consuming application or process. Related apparatus, systems, techniques and articles are also described.

20 Claims, 2 Drawing Sheets

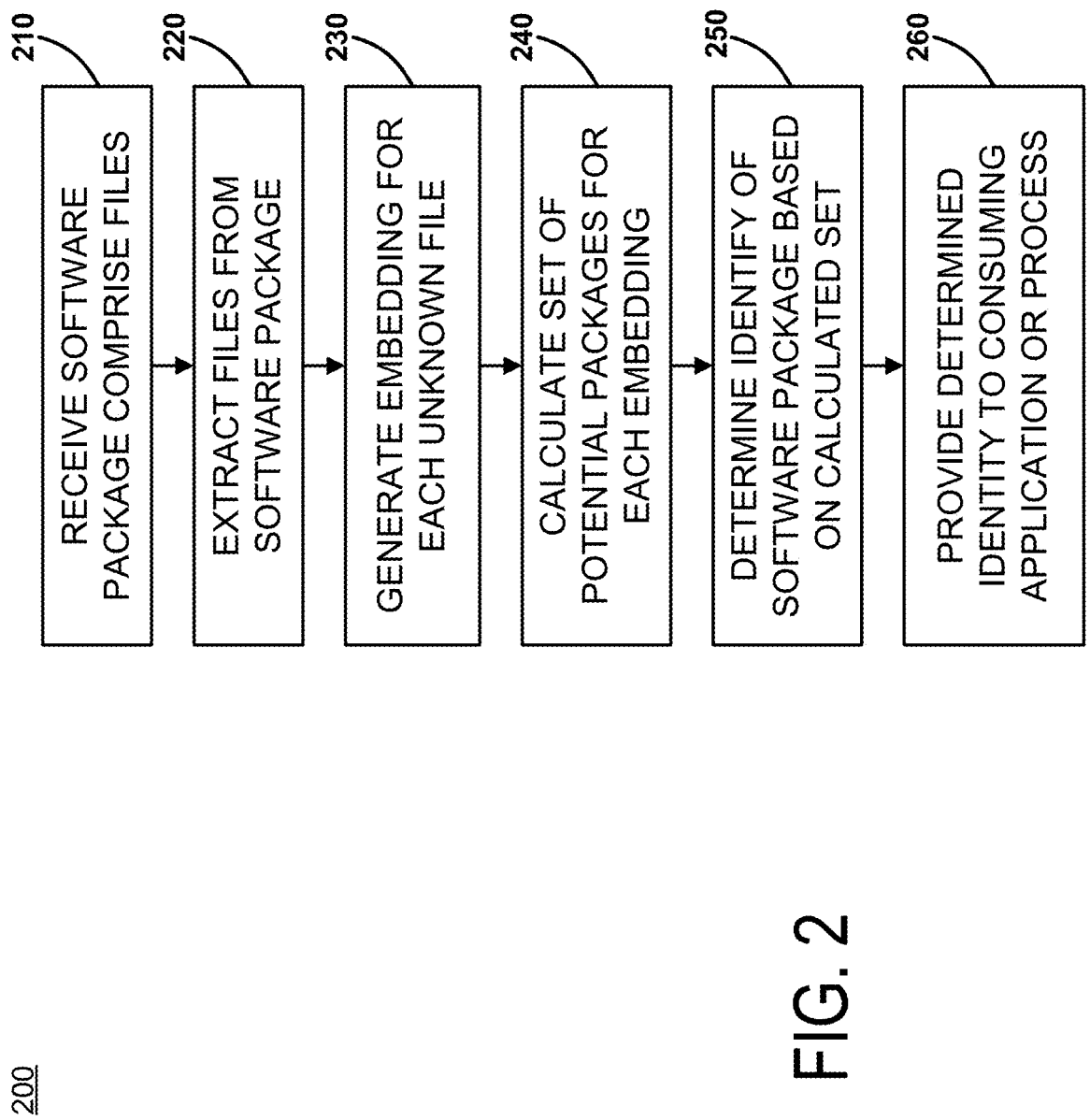

MACHINE LEARNING-BASED UNIVERSAL SOFTWARE COMPONENT IDENTIFICATION

TECHNICAL FIELD

The subject matter described herein relates to techniques for characterizing software packages within a computing environment and, in particular, to universal component identification using federated manifest learning with file-type-specific embeddings.

BACKGROUND

Recent advancements in software component identification have largely been driven by the adoption of Software Composition Analysis (SCA) tools. These tools are crucial for managing and analyzing third-party and open-source components, offering capabilities that range from package management to continuous monitoring. Notably, they enable the identification of open-source codebases, providing insights into dependencies, security risks, and licensing issues that are pivotal for maintaining software integrity and compliance.

Package managers and binary analysis tools have become foundational in identifying open-source components and managing dependencies. At the same time, vulnerability scanners have been employed to detect known vulnerabilities, which is essential for prioritizing security issues. Composition analysis tools have offered a comprehensive view of open-source components, analyzing dependencies and overall software quality, while continuous monitoring tools have ensured that applications remain updated with the latest patches and updates.

Incorporating SCA tools into the development workflow has proven to be beneficial for improving the speed, reliability, and security of software projects. By identifying potential vulnerabilities and licensing issues early, developers can mitigate risks and ensure the use of secure and reliable open-source components. The integration of such tools has allowed for a more efficient software supply chain management, ensuring that applications are built on solid ground.

SUMMARY

In a first aspect, a software package or file system is received which encapsulates a plurality of files which are then extracted. For those files that cannot be identified as part of a known software package, an embedding is generated. Using this embedding, a set of potential software packages to the file from which the embedding was generated is calculated. This calculation can use, for example, one or more similarity analysis techniques relative to a set of mapped packages and embeddings (i.e., a set of known software packages and embeddings corresponding to known constituent files, etc.). The calculation can be used to determining an identity of the software package. The determined identity can be provided to a consuming application or process.

The determining of the identity of the software package can be based on a frequency of each potential software package across all embeddings.

The mapped software packages and embeddings can form part of a cloud dataset and be generated using federated learning across different computing systems.

A composite embedding can be generated for the software package which is based on an aggregation of the embeddings generated for the unidentified files.

The files can be of differing types. As an example, one or more of the plurality of files can be an executable. An embedding for these executables can be based on static analysis of the file. As an example, the static analysis can include extracting features characterizing or comprising imported functions, strings, and section characteristics, and generating a control flow graph (CFG) of the executable, processing the CFG using a graph neural network or any other technique that results in an embedding of fixed length which represents semantic characteristics of the file. The static analysis can be used to generate a fixed-size embedding vector.

In another example, one or more of the files is a text-based configuration file. An embedding can be generated for such a file based on a combination of a structural analysis and a semantic analysis. The structural analysis can include parsing a file structure for the text-based configuration file and generating a graph or tree representation of the file structure. The semantic analysis can include inputting key names and string values into one or more large language models to generate corresponding embeddings. and encoding numerical values using normalized representations. Once the structural analysis and semantic analysis have been completed tree-based or graph-based neural network architectures can be applied to combine results of the structural analysis with results of the semantic analysis which results in a fixed-size embedding capturing both structure and content of the text-based configuration file being outputted/generated.

In some cases, one or more of the files can comprise a source code file. An embedding for a source code file can be generated based on a syntactic analysis in combination with a semantic analysis. The syntactic analysis can include generating an abstract syntax tree (AST) of code in the source code file and extracting features characterizing code complexity metrics, function calls, and variable usage patterns from the source code file and populating such extracted features into the AST. The semantic analysis can include generating semantic embeddings for code snippets from the source code file using one or more pre-trained code-specific large language models. Thereafter, features in the AST and the semantic embeddings can be combined using one or more neural networks to generate a fixed-size embedding that represents structure, style, and functionality of the code in the source code file.

In cases in which the plurality of files comprise files having different file types, embeddings corresponding to each different file type can be generated using different/specialized neural networks. These different neural networks can, for example, respectively generate embeddings of a uniform dimensionality.

In other variations, the generated embeddings corresponding to different file types can have varying dimensionalities. In some variations, the generated embeddings can be mapped (using, for example, a variational autoencoder) to a common latent space to result in uniform dimensionality. In other variations, the mapping can be performed using a neural network trained to project embeddings from different file types into a unified space while preserving similarity relationships.

In an interrelated aspect, a software package is received which encapsulates a plurality of files of varying file types. The plurality of files are extracted from the software package. Some of these files can be identified while other files are unidentified. For each unidentified file, an embedding is generated using an embedding generation technique corresponding to the file type for the unidentified file. These embeddings are used to calculate a set of potential software packages corresponding to the file from which the embedding was generated. This calculating can be performed using a similarity analysis relative to a set of mapped software packages and embeddings. The calculation can be used to determine the identity of the software package. Such identity can be provided to a consuming application or process.

Non-transitory computer program products (i.e., physically embodied computer program products) are also described that store instructions, which when executed by one or more data processors of one or more computing systems, cause at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The subject matter described herein provides many technical advantages. For example, the current subject matter employs federated learning to enhance the component identification process by employing federated learning even when package manifests or other identifying artifacts are absent. The techniques provided herein represent a significant leap in the domain, offering a dynamic, scalable learning model that adapts as new data becomes available. The current subject matter is also advantageous in that it leverages the strengths of existing SCA methods while addressing their limitations, particularly in environments lacking comprehensive manifest data. By aggregating file-specific embeddings and utilizing federated learning, the current subject matter provides a nuanced, granular level of component identification providing enhanced software management and security.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

FIG. 2 is a process flow diagram illustrating a technique for universal software package identification.

DETAILED DESCRIPTION

Figure 1:
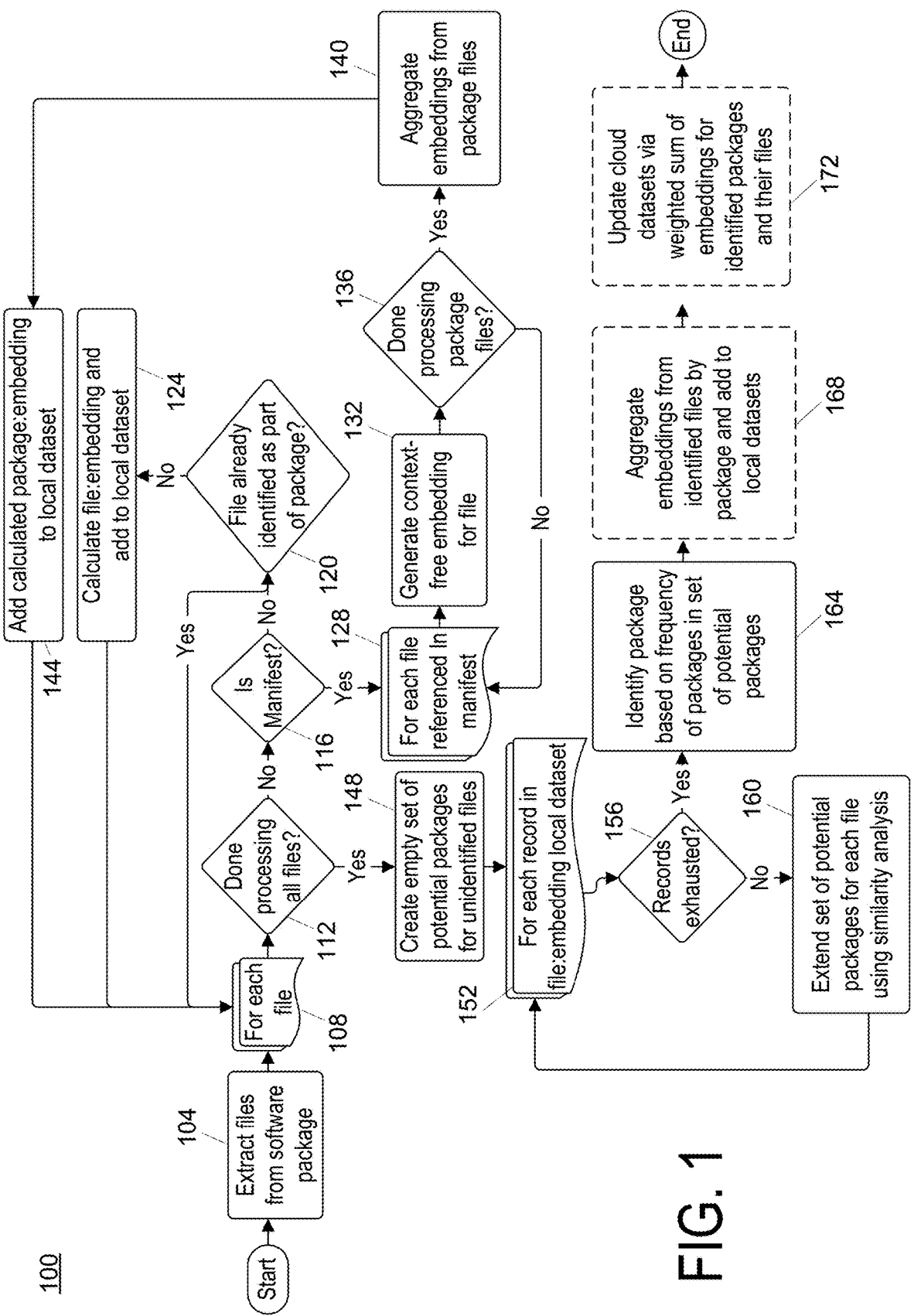
FIG. 1 is a process flow diagram illustrating a workflow for identifying software components utilizing federated learning.

The current subject matter is directed to techniques for identifying components within software packages utilizing federated manifest learning with file type-specific embeddings. Such an arrangement markedly enhances the accuracy of software component detection within distributed systems. Capitalizing on the proven capability of embeddings as high-dimensional vectors, this current subject matter captures the nuanced essence of data. These embeddings serve as multidimensional fingerprints for software components, each file imparting its distinctive informational signature. With the current subject matter, these file-specific embeddings can be aggregated from various files within a software package, improving upon conventional identification methods. This arrangement results in a composite embedding that distills the diverse contents of a software package into a single, high-fidelity vector, much like a complex fragrance composed of various notes. The resulting embedding benefits from an augmented uniqueness, significantly bolstering the precision and reliability of package identification amidst a dense landscape of features. By leveraging the intrinsic diversity of software packages and employing ground truth from environments with available package manifests and related artifacts, the current subject matter can globally enrich the identification process, ensuring robust identification even when such explicit information is missing.

FIG. 1 is a process flow diagram 100 for implementing aspects of the current subject matter which starts, at 104, with files being extracted from a software package or file system. The software package can be a binary or another container of files that are related in some specific manner. The software package can, for example, be an unknown filesystem, package or code base. In some cases, the software package can include a manifest detailing some or all of the files contained therein which can be identified by scanning the directory structure of the software package. This software package can be received or otherwise accessed as part of the analysis. The extraction can, as will be described below, act as a starting point for a series of systematic actions aimed at component identification (i.e., identifying all components within files forming part of the binary, etc.). In some variations, all files are extracted from the binary while, in other variations, only a subset of the files are extracted. For example, known files or certain file types may be omitted from the extraction process (and thus not analyzed with the workflow described below).

After the files are extracted, at 108, an iterative process commences in which each file within the binary is subjected to an individual evaluation process until, at 112, all files are processed. Until such time, it is determined, at 116, whether there is a manifest within the binary which identifies the file. In some cases, all files within the binary are referenced by the manifest (if present). In other cases, only a subset of the files are referenced in the manifest (thus requiring further analysis). If a file is not referenced in the manifest, then a further determination is made, at 120, whether the file was already identified as being part of a package. If it is determined that the file has already been analyzed, the process returns to 108 to process the next non-identified file. If the file has not already been identified as part of a package, at 124, a file embedding is calculated based on the file being analyzed. This embedding can be generated by taking an output of a layer of a neural network (e.g., the output of a hidden layer, etc.) and can captures the essence of the file's role within its package. The neural network used to generate the embedding can, for example, be trained using a large number of files with known identities/attributes which are useful for file identification. This file embedding can be added to a local dataset for later analysis/use as will be described in further detail below.

When it is determined, at 116, that there is a manifest within the software package (e.g., by scanning the directory structure, etc.), a sub-process (also iterative) is initiated in which the manifest is parsed and, for each file referenced in the manifest (128), a context-free embedding is generated at 132. Context-free embedding provides a baseline representation of the file which can be used for comparison with known embeddings. Stated differently, context-free means that there is no associated file associated with the embedding at this stage (unlike at 124). This process continues, until at 136, all files referenced in the manifest have been processed resulting in an embedding for each known file.

Thereafter, at 140, a package embedding is generated from files referenced in the manifest through an aggregation process. In the cases in which certain files are identified and others are not identified by the manifest, the package embedding can include only those embeddings associated with files listed in the manifest. In other variations in which there are mixed identified/non-identified files, all embeddings can be aggregated to generate the package embedding.

The package embedding can be, for example, a combination or other aggregation of values from some or all of the context-free embeddings corresponding to files in the manifest. The combination, can, for example, be based on an average of values across the context-free embeddings (which may or not be weighted). In some variations, a machine learning model can be trained on the compression step (i.e., the step for reducing the dimensionality of features extracted from the file to result in the embedding) so as to make different features more prominently considered or weighted. The package embedding is then added, at 144, to the local dataset.

An empty set of potential packages can be created, at 148, for any files which remain unidentified after the above operations have completed. An iterative process begins, at 152, in which for each record in the file: embedding local dataset (i.e., record in which the file is identified and there is a corresponding calculated embedding), a similarity analysis is conducted, at 160, to extend the potential packages associated with the particular file. The similarity analysis, can for example, be a distance-based measurement (e.g., cosine, etc.) based on the embedding and other embeddings with known packages in a different dataset such that only a predefined number of potential packages are identified for each file (e.g., top 10 potential packages, etc.). In some cases, the similarity analysis is a simple lookup to seek matching potential files for a particular embedding. The different dataset can, for example, be a cloud-based dataset. In some variations, as described in further detail below, the cloud-based dataset can be generated by or otherwise used in connection with a federated learning platform for identifying software packages across different systems which may be associated with different users/customers. This process continues until, at 156, the sub-process for adding potential files is completed for each file in the set.

In some variations, at 168, the embeddings for each identified file can, at 168, be aggregated (in a similar manner to that described above in connection with operation 140) to generate a composite embedding (which characterizes the software package). Such composite embedding can be added to a local dataset and used for identifying (by way of a similarity measurement or otherwise) subsequent unidentified files. Further, at 172, cloud datasets can be updated using a weighted sum of embeddings for identified packages and their files (thus allowing for federated learning to be implemented across different models).

The current subject matter employs a flexible and extensible approach to generate embeddings for a wide variety of file types. While the specific techniques for generating embeddings can vary based on the nature of the file, the overall framework provided herein allows for the incorporation of new file types and structures as they emerge. Following are different, but non-limiting examples on how the current subject matter accommodates diverse file types.

For executable files (e.g., ELF, PE, etc.), embedding generation for executable files can employ a multi-faceted analysis. A static analysis can be used to extract features such as imported functions, strings, and section characteristics. This extracted information can be used to generate a control flow graph (CFG) of the executable. The static analysis can be used in tandem with dynamic analysis such as performing sandboxed execution of the executable to capture runtime behavior while also recording system calls, memory access patterns, network activity, and the like. After the static analysis and optionally the dynamic analysis, the embedding can be created using graph neural networks to process the CFG and combining graph-based features with static and dynamic analysis results to ultimately generate a fixed-size embedding vector that encapsulates the executable's characteristics.

For text-based configuration files (e.g., JSON, XML, YAML, etc.). a combination of structural and semantic analysis can be employed. For structural analysis, the file structure (e.g., object hierarchy, tree structure) can be parsed and a graph or tree representation of the parsed file structure can be generated. For semantic analysis, pre-trained language models can be used to generate embeddings for key names and string values. In addition, numerical values can be encoded using normalized representations. Thereafter, in order to create the embedding, a tree-based or graph-based neural network architecture is applied to combine structural and semantic information from which a fixed-size embedding is output that captures both the structure and content of the configuration file.

For source code files, both syntactic and semantic features can be captured. A syntactic analysis can include generating an abstract syntax tree (AST) of the code and extracting features such as code complexity metrics, function calls, and variable usage patterns. Semantic analysis can include employing code-specific pre-trained models to generate embeddings for code snippets. The embedding can be created by combine AST features and semantic embeddings using advanced neural network architectures to produce a fixed-size embedding that represents the code's structure, style, and functionality.

The current subject matter can also accommodate any file type or structure, including but not limited to: binary data files (e.g., images, audio, etc.), compressed archives, domain-specific file formats (e.g., CAD files, scientific data formats, etc.), as well as emerging file types and structures. For each new file type, appropriate feature extraction and embedding generation techniques can be developed and integrated into the system. This extensibility ensures that the software component identification system remains effective and relevant as technology evolves.

To enable effective comparison and aggregation of embeddings from different file types, the system can employ two primary strategies namely: uniform dimensionality by design and mapping to a common latent space.

With regard to uniform dimensionality by design, embedding generation processes can be engineered to output embeddings of the same dimensionality, regardless of the input file type. This uniformity can be achieved through file type-specific neural network architectures with standardized output layers and dimensionality reduction or expansion techniques tailored to each file type's characteristics. This approach allows for direct comparison and aggregation of embeddings from different file types without additional processing.

With regard to mapping to a common latent space, when embeddings are generated with different dimensionalities or capture fundamentally different aspects of files, the system can map them to a common latent space. Different approaches can be used in this regard. One example is a variational autoencoder (VAE) approach in which type-specific VAEs are trained to encode embeddings into a shared latent space which serves as the unified embedding, allowing for comparison across file types. A projection layer approach can utilize a neural network architecture with type-specific input layers and a common output layer. The neural network can be trained to project embeddings from different file types into a unified space while preserving similarity relationships. These unification strategies ensure that embeddings from any file type can be effectively compared and aggregated, enabling comprehensive analysis of software packages that may contain diverse file types.

FIG. 2 is a process flow diagram 200 in which, at 210, a software package is received which encapsulates a plurality of files. Thereafter, at 220, the plurality of files are extracted from the software package. For any unidentified files within the plurality of files, at 230, a corresponding embedding is generated. Subsequently, at 240, for each embedding, a set of potential software packages calculated using a similarity analysis relating to mapped software packages and embeddings (i.e., previously characterized software packages and embeddings based on the constituent files within the software packages). Based on the calculation, at 250, an identity of the software package is determined. This determined identity can be provided, at 260, to a consuming application or process. The consuming application or process can, in some cases and based on the determined identity, take remedial action regarding the software package such as isolating it or otherwise preventing it from being executed and/or accessed.

Various implementations of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

Although a few variations have been described in detail above, other modifications are possible. For example, the logic flow depicted in the accompanying figures and described herein do not require the particular order shown, or sequential order, to achieve desirable results. Other embodiments may be within the scope of the following claims.

What is claimed is:

1. A method comprising:
   receiving a software package encapsulating a plurality of files;
   extracting the plurality of files from the software package;
   generating, for each unidentified file within the plurality of files using an output of a hidden layer of a neural network, an embedding, the neural network being trained using a corpus of files with known identifies and attributes for file identification;
   calculating, for each embedding using a distance-based similarity analysis relative to a set of mapped software packages and embeddings, a set of potential software packages corresponding to the file from which the embedding was generated;
   determining, based on the calculating, an identity of the software package; and
   providing the determined identity to a consuming application or process.

2. The method of claim 1, wherein the determining of the identity of the software package is based on a frequency of each potential software package across all embeddings.

3. The method of claim 1, wherein the mapped software packages and embeddings form part of a cloud dataset and are generated using federated learning across different computing systems.

4. The method of claim 1 further comprising:
   generating a composite embedding for the software package based on an aggregation of the embeddings generated for the unidentified files.

5. The method of claim 1, wherein at least one of the unidentified files is an executable, and wherein the generating further comprises:
    extracting features characterizing or comprising imported functions, strings, and section characteristics;
    generating a control flow graph (CFG) of the executable;
    processing the CFG using a graph neural network; and
    generating, based on the processing of the CFG, a fixed-size embedding vector encapsulating characteristics of the executable.

6. The method of claim 5, wherein the generating further comprises:
    executing the executable in a sandbox environment; and
    recording system calls, memory access patterns, and network activity of the executable in the sandbox environment;
    wherein the fixed-size embedding vector is further based on the recorded system calls, memory access patterns, and network activity.

7. The method of claim 1, wherein at least one of the unidentified files is a text-based configuration file, and wherein the generating comprises:
    performing a structural analysis by:
        parsing a file structure for the text-based configuration file; and
        generating a graph or tree representation of the file structure;
    performing a semantic analysis by:
        inputting key names and string values into one or more large language models to generate corresponding embeddings; and
        encoding numerical values using normalized representations;
    applying tree-based or graph-based neural network architectures to combine results of the structural analysis with results of the semantic analysis; and
    outputting a fixed-size embedding capturing both structure and content of the text-based configuration file.

8. The method of claim 1, wherein at least one of the unidentified files is a source code file, and wherein the generating comprises:
    performing a syntactic analysis by:
        generating an abstract syntax tree (AST) of code in the source code file; and
        extracting features characterizing code complexity metrics, function calls, and variable usage patterns from the source code file and populating such extracted features into the AST;
    performing a semantic analysis by: generating semantic embeddings for code snippets from the source code file using one or more pre-trained code-specific large language models; and
    combining features in the AST and the semantic embeddings using one or more neural networks to generate a fixed-size embedding that represents structure, style, and functionality of the code in the source code file.

9. The method of claim 1, wherein the plurality of files comprise files having different file types.

10. The method of claim 9, wherein embeddings corresponding to different file types are generated using different neural networks.

11. The method of claim 10, wherein the different neural networks are configured to respectively generate embeddings of a uniform dimensionality.

12. The method of claim 11, wherein the generated embeddings have different dimensionalities.

13. The method of claim 12 further comprising:
    mapping the generated embeddings to a common latent space to result in uniform dimensionality.

14. The method of claim 13, wherein the mapping is performed by a variational autoencoder.

15. The method of claim 13, wherein the mapping is performed using a neural network trained to project embeddings from different file types into a unified space while preserving similarity relationships.

16. A method comprising:
    receiving a software package encapsulating a plurality of files, at least a portion of the files being of a different file type;
    extracting the plurality of files from the software package;
    generating, for each unidentified file within the plurality of files, an embedding using an embedding generation technique corresponding to the file type for the unidentified file, each embedding generation technique utilizing an output of a hidden layer of a neural network which corresponds to the file type, each neural network being trained using a corpus of files of the corresponding file type with known identifies and attributes for file identification;
    calculating, for each embedding using a distance-based similarity analysis relative to a set of mapped software packages and embeddings, a set of potential software packages corresponding to the file from which the embedding was generated;
    determining, based on the calculating, an identity of the software package; and
    providing the determined identity to a consuming application or process.

17. The method of claim 16, wherein at least one of the unidentified files has a file type corresponding to an executable, and wherein the generating further comprises:
    extracting features characterizing or comprising imported functions, strings, and section characteristics;
    generating a control flow graph (CFG) of the executable;
    processing the CFG using a graph neural network; and
    generating, based on the processing of the CFG, a fixed-size embedding vector encapsulating characteristics of the executable.

18. The method of claim 17, wherein the generating further comprises:
    executing the executable in a sandbox environment; and
    recording system calls, memory access patterns, and network activity of the executable in the sandbox environment;
    wherein the fixed-size embedding vector is further based on the recorded system calls, memory access patterns, and network activity.

19. The method of claim 16, wherein at least one of the unidentified files has a file type corresponding to a text-based configuration file, and wherein the generating comprises:
    performing a structural analysis by:
        parsing a file structure for the text-based configuration file; and
        generating a graph or tree representation of the file structure;
    performing a semantic analysis by:
        inputting key names and string values into one or more large language models to generate corresponding embeddings; and
        encoding numerical values using normalized representations;

applying tree-based or graph-based neural network architectures to combine results of the structural analysis with results of the semantic analysis; and outputting a fixed-size embedding capturing both structure and content of the text-based configuration file.

20. The method of claim 16, wherein at least one of the unidentified files has a file type corresponding to a source code file, and wherein the generating comprises:

performing a syntactic analysis by:
generating an abstract syntax tree (AST) of code in the source code file; and
extracting features characterizing code complexity metrics, function calls, and variable usage patterns from the source code file and populating such extracted features into the AST;
performing a semantic analysis by: generating semantic embeddings for code snippets from the source code file using one or more pre-trained code-specific large language models; and
combining features in the AST and the semantic embeddings using one or more neural networks to generate a fixed-size embedding that represents structure, style, and functionality of the code in the source code file.

* * * * *